(12) United States Patent
Erickson et al.

(10) Patent No.: US 6,422,443 B1
(45) Date of Patent: Jul. 23, 2002

(54) BICYCLE CARRIER WITH UNITARY FRAME AND LEVELING INDICATORS

(75) Inventors: Donald Erickson, Saratoga; George Chiou, Oakland, both of CA (US)

(73) Assignee: Yakima Products, Inc., Arcata, CA (US)

( * ) Notice: Subject to any disclaimer, the term of this patent is extended or adjusted under 35 U.S.C. 154(b) by 0 days.

(21) Appl. No.: 09/540,165

(22) Filed: Mar. 31, 2000

(51) Int. Cl.⁷ .............................. B60R 9/10; B60R 9/06
(52) U.S. Cl. ...................... 224/532; 224/492; 224/493; 224/495; 224/500; 224/924
(58) Field of Search ................ 224/488, 492, 224/493, 495, 500, 531, 532, 924; D12/406, 407, 408, 412

(56) References Cited

U.S. PATENT DOCUMENTS

| | | | |
|---|---|---|---|
| 4,089,448 A | | 5/1978 | Traeger ................ 224/42.03 B |
| 4,332,337 A | | 6/1982 | Kosecoff ............. 224/42.03 B |
| 4,394,948 A | * | 7/1983 | Graber ................... 224/924 X |
| 4,428,516 A | | 1/1984 | Allen .......................... 224/314 |
| 4,597,554 A | * | 7/1986 | James .......................... 248/542 |
| 4,863,080 A | | 9/1989 | Graber ................ 224/42.03 B |
| 4,875,608 A | | 10/1989 | Graber ................ 224/42.03 B |
| 5,056,700 A | | 10/1991 | Blackburn et al. .......... 234/324 |
| 5,058,283 A | | 10/1991 | Wise et al. .................... 33/371 |
| 5,135,145 A | * | 8/1992 | Hannes et al. ............... 224/493 |
| 5,157,842 A | | 10/1992 | Swanda ........................ 33/365 |
| D331,214 S | | 11/1992 | Johnson ..................... D12/158 |
| 5,195,670 A | * | 3/1993 | Piretti et al. ............. 224/493 X |
| 5,211,323 A | * | 5/1993 | Chimenti et al. ........ 224/924 X |
| D348,640 S | | 7/1994 | Hall ........................... D12/408 |
| 5,363,996 A | * | 11/1994 | Raaber et al. ........... 224/493 X |
| 5,377,885 A | * | 1/1995 | Wyers ......................... 224/493 |
| 5,398,422 A | | 3/1995 | Clarkson ...................... 33/365 |
| 5,495,970 A | * | 3/1996 | Pedrini ................... 224/924 X |
| 5,505,357 A | * | 4/1996 | Chimenti et al. ....... 224/493 X |
| 5,625,956 A | | 5/1997 | Cone, II et al. .............. 33/370 |
| 5,636,816 A | * | 6/1997 | Burton et al. ............... 248/208 |
| 5,645,202 A | * | 7/1997 | Kaloustian ............. 224/493 X |
| 5,738,259 A | * | 4/1998 | Allen .......................... 224/493 |
| 5,806,196 A | * | 9/1998 | Gibbs et al. .................. 33/333 |
| 5,810,231 A | | 9/1998 | Kravitz ........................ 224/532 |
| 5,826,767 A | | 10/1998 | Chimenti et al. ........... 224/324 |
| 5,984,347 A | * | 11/1999 | Blanc-Rosset .......... 224/275 X |
| 6,116,485 A | * | 9/2000 | Watkins ....................... 224/275 |

* cited by examiner

*Primary Examiner*—Gregory M. Vidovich
(74) *Attorney, Agent, or Firm*—Kolisch Hartwell Dickinson McCormack & Heuser

(57) ABSTRACT

An improved bicycle carrier is provided for mounting to the rear end of an automobile to receive and support one or more bicycles. The bicycle carrier has a frame formed from a unitary convolutely-shaped metal bar that defines a pair of bicycle support members on one end and a vehicle engaging member at the other end. The frame is shaped such that the vehicle engaging member can be positioned to engage and rest against the rear end of an automobile with the support members projecting rearwardly for receiving one or more bicycles. A stabilizer is secured to the frame and extends away from the support members for resting on the trunk of a car to stabilize the carrier. The stabilizer is selectively movable in the vertical direction and can be locked in place to insure that the support members extend at a predetermined attitude relative to horizontal. A leveling indicator is provided on the frame for indicating an optimum attitude of the support arms during adjustment of the stabilizer. When the leveling indicator indicates optimum attitude, the stabilizer is locked into position and the carrier is lashed to the automobile with straps.

10 Claims, 4 Drawing Sheets

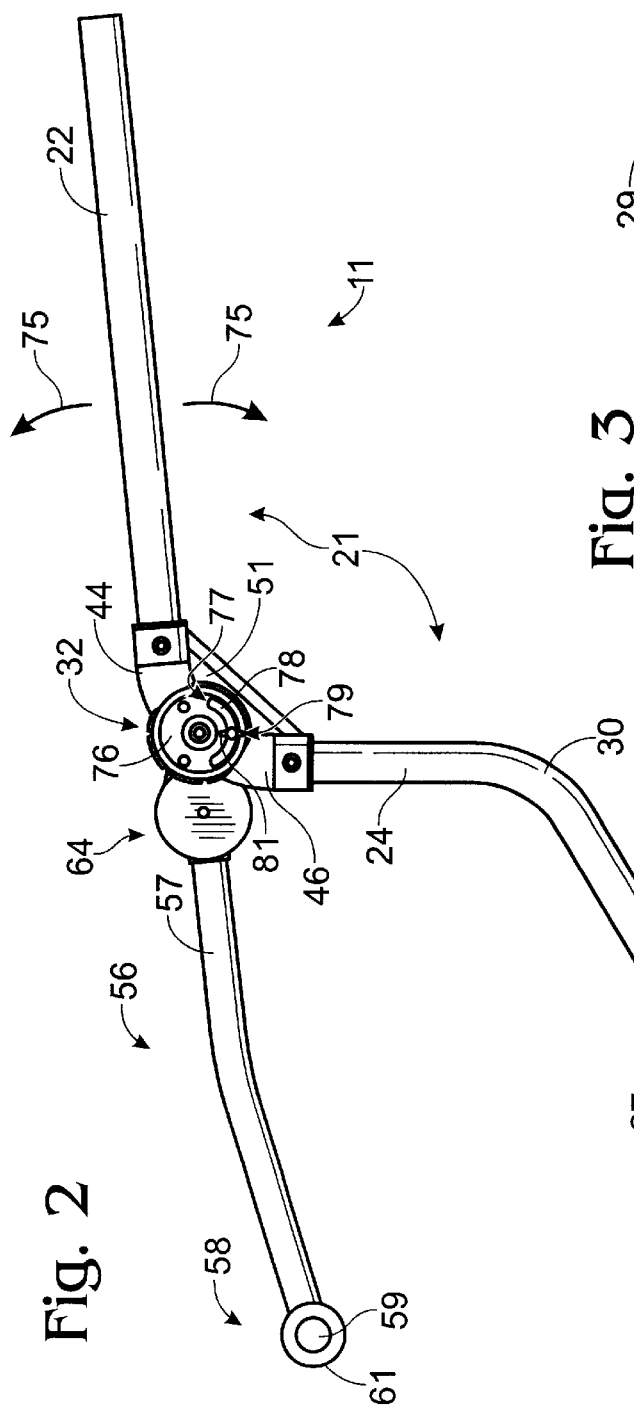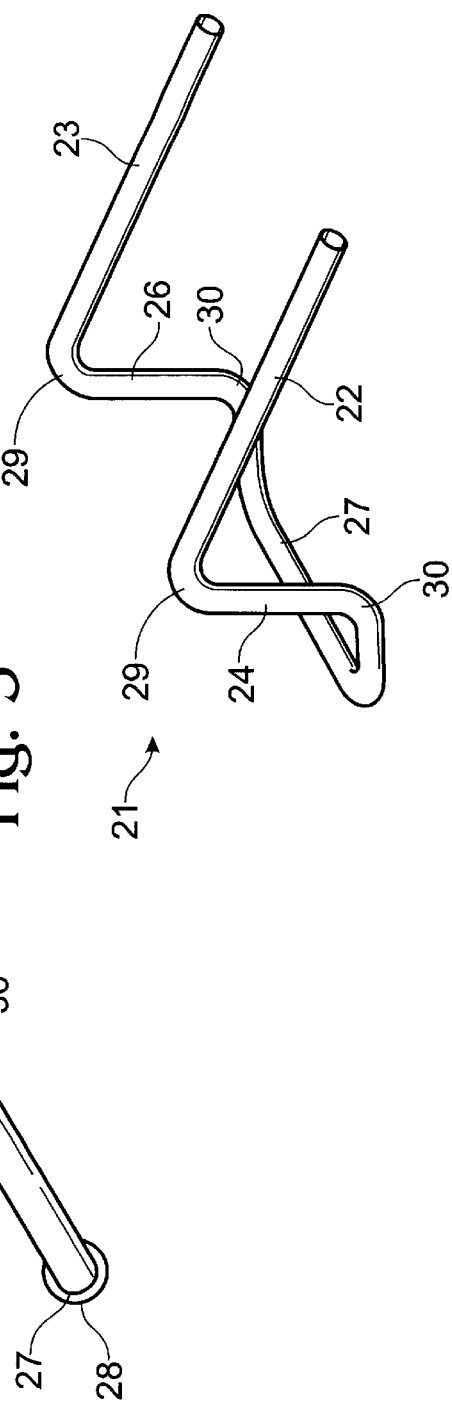

BICYCLE CARRIER WITH UNITARY FRAME AND LEVELING INDICATORS

BACKGROUND OF THE INVENTION

1. Field of the Invention

This invention relates generally to devices for transporting bicycles and more specifically to automobile mountable bicycle carriers adapted to be secured to the rear or trunk portion of an automobile.

2. Description of the Related Art

Bicycling has become a popular sport in recent years and the number of cyclists engaged in casual, sports, and extreme bicycling have increased dramatically. Many popular bicycling activities, such as mountain biking for example, are generally enjoyed at remote locations distant from a cyclist's home. As a result, there arose a need with the increasing popularity of bicycling for convenient and reliable methods of transporting bicycles to and from bicycling locations. To fill this need, a variety of automotive bicycle carriers have been developed. Some of these carriers, referred to as roof-mount carriers, are mounted to the roof of an automobile for securing one or more bicycles to the roof for transport. Others, known as trunk-mount carriers, are designed to be mounted to the rear end or trunk portion of an automobile for carrying one or more bicycles immediately behind the automobile. In general, trunk-mount carriers include tubular frames that are strapped to the rear end portion of an automobile and include a pair of rearwardly projecting arms upon which one or more bicycles are suspended and secured for transport.

Rear-mount bicycle carriers are available in a number of configurations. U.S. Pat. No. 5,056,700, for example, discloses an automobile mountable bicycle carrier that is mounted to the trunk portion of an automobile. The carrier has a central hub from which a U-shaped trunk engaging bar and a U-shaped bumper engaging bar extend at an angle relative to each other. The carrier is mounted to an automobile by lashing it with straps to the rear end portion with the trunk engaging bar resting on the trunk and the bumper engaging bar resting on top of the rear bumper. A U-shaped support member defining a pair of spaced support arms extends rearwardly (with respect to the automobile)from the central hub and is pivotally adjustable at the hub to extend substantially horizontally. A pair of mounting brackets or blocks are attached to each of the spaced support arms for receiving bicycle frames to suspend the frames from the support arms for transport.

Another common trunk-mount bicycle carrier is disclosed in U.S. Pat. No. 5,826,767 of Chimenti et al. This carrier is similar to that of Blackburn et al. in that it includes a pair of hubs from which U-shaped trunk engaging and bumper engaging bars extend. A rearwardly projecting support bar extends from each of the hubs and each support bar is provided with one or more rubberized mounting blocks or cradles for receiving and securing the top post of a bicycle frame. Thus, one or more bicycles may be suspended from the support bars for transport. In the Chimenti et al. carrier, the bumper engaging bar and the rearwardly projecting support bars are permanently fixed to the central hub at predetermined angles relative to each other. The trunk-engaging bar, however, is pivotally mounted to the hub and may be rotated about the hub and locked in a predetermined angular orientation with respect to the bumper engaging bar. In use, the bumper engaging bar is rested upon the rear bumper and the carrier moved up or down until the support bars extend substantially horizontally. The trunk engaging bar is then pivoted downwardly until it engages the trunk, where it is locked into position. The carrier is then lashed to the trunk with straps, which have hooks that fasten onto the edges of the trunk lid, to secure the carrier in place for transporting bicycles.

A variety of other trunk-mount bicycle carrier designs are also disclosed in the art, including carriers illustrated in U.S. Pat. Nos. 4,863,080; 4, 875,608; 4,332,337; 4,428,516; and others. These and similar trunk-mount bicycle carriers, such as those discussed above, while generally reliable for transporting bicycles, nevertheless exhibit certain problems and shortcomings inherent is their various designs. For example, many prior art carriers are formed from several bent metal rods that form the various members of the carrier and that are tied together at their ends at spaced apart hub assemblies. In many cases, the member or members that serve as the horizontally extending support bars are pivotable about the hub and mechanisms are provided for locking these members is a variety of positions or attitudes relative to horizontal. This feature is required because automotive trunk configurations differ and it is necessary to adjust the support bars until they are substantially horizontal or angled slightly upwardly to support bicycles for a wide variety of automobile types. One problem, however, is that the hub assemblies generally include relatively complex mechanical pivot and locking systems that are prone to wear and tear over time and that require regular maintenance to prevent lubricant drying and the accumulation of mud and dirt that can hamper operation of the assembly. Furthermore, in these types of carriers, the weight of bicycles suspended from the support bars is carried by the pivot and locking mechanisms of the hubs. Over time, the weight of the bicycles and the constant motion during transport can fatigue these mechanisms, even to the point of failure in some cases. Finally, it is not always easy to gauge when the support bars are oriented at the optimum attitude for receiving and supporting bicycles.

Other types of bicycle racks, such as those disclosed in U.S. Pat. Nos. 4,332,337 of Kosecoff and 4,863,080 of Grager, do not have hubs or pivotally adjustable support bars. While these carriers are simpler, they nevertheless are not fully adaptable to a variety of automotive trunk configurations and in many cases, the support bars do not extend at the appropriate optimal attitude as is preferred when the carrier is mounted to an automobile.

Thus, a need exists for a trunk-mount bicycle carrier that is simple and sturdy in construction, that does not include complex, maintenance intensive, and failure prone mechanical pivot mechanisms for adjusting the orientation of the support bars, but that nevertheless provides for simple and accurate adjustment of the support bar orientation to an optimum attitude for carrying bicycles. The weight of carried bicycles should not be born by hub assemblies or other mechanical components as in the prior art, but should be transferred directly to the automobile to eliminate stress related fatigue found in many prior art carriers. Finally, the carrier should be economical to produce and easily stowed and deployed by a user. It is to the provision of such a bicycle carrier that the present invention is primarily directed.

SUMMARY OF THE INVENTION

Briefly described, the present invention, in one preferred embodiment thereof, comprises an improved bicycle carrier for mounting to the rear end portion of an automobile to support one or more bicycles for transport. The bicycle carrier is characterized by a unitary or single piece convolutely-shaped frame preferably formed of sturdy tubular steel, aluminum, or other appropriate metal. The unitary frame is shaped to define a pair of spaced apart substantially parallel support bars at one end for supporting one or more bicycles. The other end of the frame is generally U-shaped and defines a vehicle engaging member for engaging and resting against the rear end portion of an automobile, preferably atop the bumper in the preferred embodiment. A first hub-shaped bracket is mounted to the frame intermediate one of the support bars and the vehicle engaging member. Preferably, the bracket is mounted at the forward end of the support bar where the frame bends downwardly to begin to form the vehicle engaging member. A second similarly shaped bracket is mounted to the frame intermediate the other one of the support bars and the vehicle engaging member, preferably at the same location. Thus, the first and second brackets are spaced apart and aligned with each other.

A cross member is mounted to and extends between the first and second brackets to tie the two sides of the frame together. A stabilizer in the form of a generally J-shaped arm is mounted to the cross member and extends therefrom in a direction generally away from the support bars to a free end. The free end of the stabilizer is configured to engage and rest against the trunk lid of the automobile for stabilizing the carrier. The stabilizer preferably is pivotally secured to the cross member and can be locked in a selected pivotal orientation. In this way, the carrier can be placed against the rear end of an automobile with its vehicle engaging member and stabilizer resting against the car, whereupon the stabilizer can be pivotally adjusted until the support arms are oriented at an optimum attitude for receiving and supporting one or more bicycles. The stabilizer can then be locked in place to fix the support arms in the desired attitude. Means for lashing the carrier securely to the automobile includes a set of straps that extend preferably from the cross member to hooks or clips, which clip onto selected edges of the trunk lid or rear bumper in the traditional manner. The straps are then tightened to secure the carrier to the automobile.

At least one leveling indicator is provided on the frame for indicating to a user during adjustment of the carrier when the support arms are oriented at the proper attitude for carrying bicycles. The optimum attitude may be substantially horizontal or may be at a slight upward angle. In any event, when the support arms are in the optimum or desired attitude, the leveling indicator so indicates and the stabilizer can be locked and the carrier lashed to the automobile. In the preferred embodiment, the leveling indicator is built into at least one of the hub-shaped brackets of the carrier and includes a small ball that rolls within an arcuate track within the bracket. A cap covers the ball and track and is formed with an opening, preferably in the form of a curved slot, through which the ball may be viewed. An index mark is provided on the cap to indicate the position of the ball that corresponds to a proper attitude of the support bars. When adjusting the carrier, the frame is simply moved up and down until the ball aligns with the index mark, whereupon the stabilizer is locked and the carrier lashed securely in place with its straps.

It will be seen that a trunk-mount bicycle carrier is now provided that addresses successfully the problems and shortcomings of prior art carriers. Specifically, the complex mechanical hubs of the prior art are eliminated and replaced by a strong, single piece, convolutely-shaped tubular frame that defines both the support members and one of the vehicle engaging members. Thus, the problems with such hubs is eliminated. Further, the weight of bicycles suspended from the support bars is transferred through the unitary frame directly to the automobile, eliminating stress fatigue in interconnecting hubs and their locking mechanisms. Simple one-step adjustment of the carrier to fit virtually any automobile configuration is provided by the single piece stabilizer, which is simply pivoted and locked to adjust the attitude of the support members. Finally, a reliable and convenient leveling indicator assures that the carrier is properly adjusted every time for correct placement and orientation of the support bars. When not in use, the stabilizer may simply be pivoted downwardly to form a compact storage configuration of the carrier.

These and other features, objects, and advantages of the invention will become more apparent upon review of the detailed description of the preferred embodiments set forth below, when taken in conjunction with the accompanying drawing figures, which are briefly described as follows.

BRIEF DESCRIPTION OF THE DRAWINGS

FIG. 2 is a side elevational view of the bicycle carrier of FIG. 1

FIG. 3 is a perspective view of the convolutely-shaped unitary frame that forms a part of the carrier of this invention.

DETAILED DESCRIPTION OF THE PREFERRED EMBODIMENTS

Figure 1:
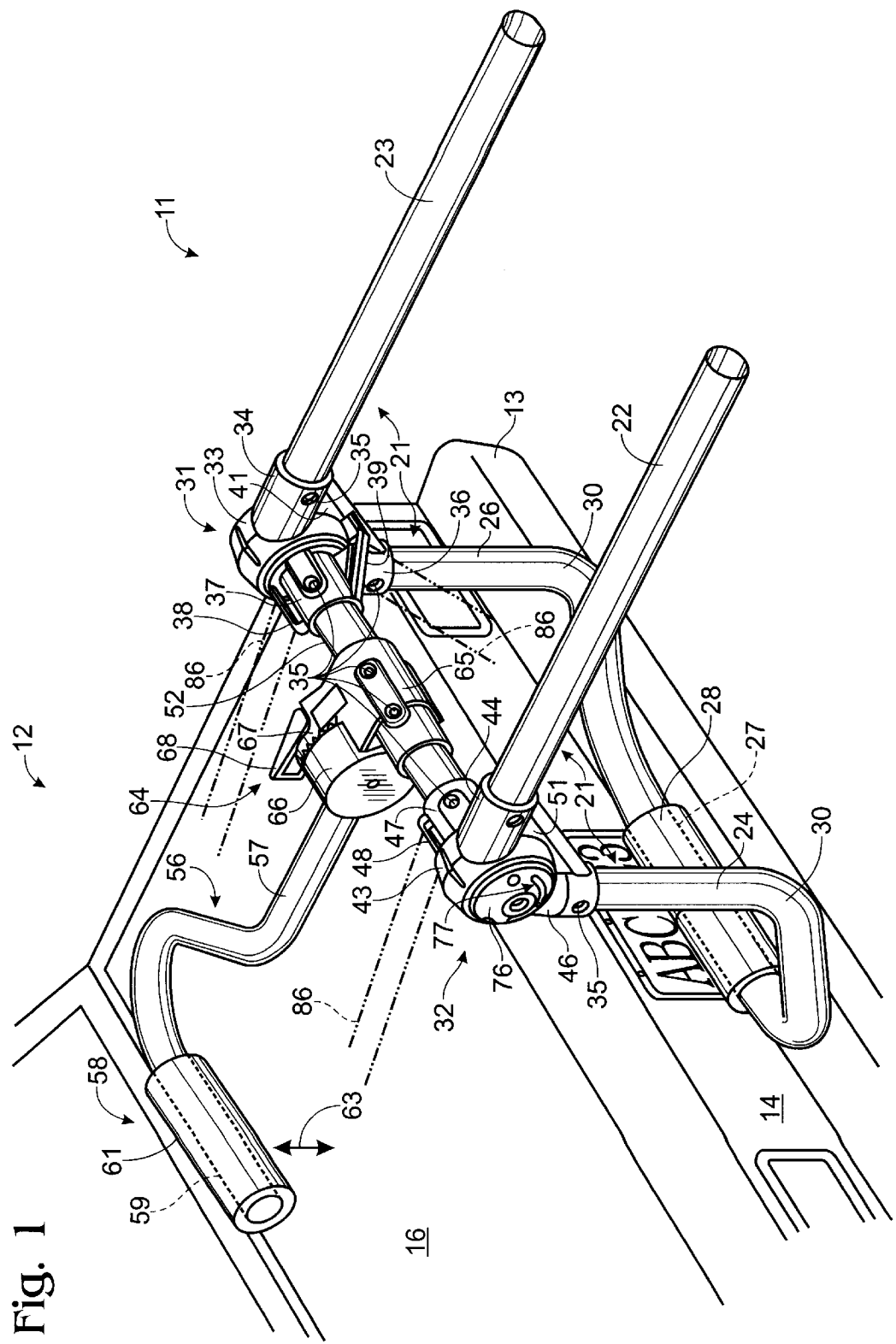
FIG. 1 is a perspective view of a bicycle carrier that embodies principles of the present invention in a preferred form and shown mounted to the rear end portion of an automobile.

Referring now in more detail to the drawings, in which like numerals refer where appropriate to like parts throughout the several views, FIG. 1 illustrates a bicycle carrier that embodies principles of the present invention on one preferred form. The bicycle carrier 11 is shown mounted to the rear end of an automobile 12 as it appears when positioned for carrying one or more bicycles. The automobile 12 has a rear bumper 13, which meets a back panel 14, and a trunk lid 16 covers and closes the trunk of the automobile. Of course, FIG. 1 illustrates a generic automobile rear end for illustration purposes, and it is well known that a wide variety of vehicle rear end configurations are possible. The bicycle carrier of this invention is mountable to the rear end portions of most modern automobiles.

The bicycle carrier 11 comprises a single piece or unitary convolutely-shaped frame 21 that defines a pair of spaced apart parallel support bars 22 and 23 upon which one or more bicycles are suspended for being transported. The frame 21 preferably is formed of tubular steel, aluminum, or other appropriate metal for strength and rigidity when supporting and carrying one or more bicycles. It will be understood that, in practice, bicycle cradles that preferably include anti-sway devices or sway arresters are mounted to the support bars for receiving and securing bicycles thereto. These elements are omitted from FIG. 1 for clarity of description.

The convolutely-shaped frame 21 includes bends 29 (FIG. 3) at the forward (relative to the automobile) end portions of the support bars and the bends 29 merge into generally vertically oriented bars 24 and 26 respectively. Bends 30 at the bottoms of vertically oriented bars 24 and 26 merge into a substantially U-shaped vehicle engagement section 27 of the frame, which extends transversely relative to the support bars 22 and 23. A tubular padded sleeve 28 preferably covers the vehicle engagement section of the frame. The padded sleeve 28 serves to prevent scratching of the automobile by the vehicle engagement section 27 of the frame and also provides friction between the automobile and the frame to prevent the carrier from sliding or moving during bicycle transport. The vehicle engagement section 27 and its padded sleeve preferably rest atop the bumper 13 of the automobile and the padded sleeve nestles within the junction between the bumper 13 and the back panel 14 to provide secure support for the carrier.

A first hub-shaped bracket 31 is attached to the frame 11 covering the bend 29 at the forward end of the support bar 23. The bracket 31, which preferably is formed of injection molded plastic, is configured with a bracket body 33 from which a first tubular sleeve 34 extends and covers a short section of the support arm 23. A second tubular sleeve 36 extends from the body 33 and covers a short section of the vertically extending tube 26. The bracket 31, which may be formed from two halves or shells, is attached to the frame with appropriate fasteners such as screws that extend through screw holes 35 in the bracket and into the tubular metal of the frame 21. A laterally projecting tubular socket 37 extends inwardly from the bracket for purposes described in more detail below. A pair of strap guides 38 and 39 are formed with the tubular socket 37 for receiving and positioning straps 86 that are used to lash the bicycle carrier securely to the automobile in the traditional manner. The bracket 31 preferably is formed with an angled brace 41 to provide added support to the support bar 23.

Similarly, a second hub-shaped bracket 32 is attached to the frame 11 covering the bend 29 at the forward end of the support bar 22. The second bracket 32 is a mirror image of the first bracket 31 and includes a body 43 from which extends a first tubular sleeve 44 covering a short section of the support bar 22 and a second tubular sleeve 46 covering a short section of the vertically extending tube 24. A tubular socket 47 with integral strap guides 48 projects inwardly from the bracket 32. The tubular socket 47 faces and opposes the tubular socket 37 of the bracket 31. An end or hub cap 76 is attached to and forms the outside face of the bracket 32 and a similar hub cap, which is not visible in FIG. 1, is attached to and forms the outside face of the bracket 31 on the other side of the carrier 11. As described in more detail below, the hub cap 76 is formed with a leveling indicator 77, which provides a visual guide for positioning the support arms 22 and 23 at the proper attitude relative to horizontal when the bicycle carrier is attached to an automobile.

A cross member 52 in the form of a sturdy metal bar is received at its ends in and extends between the opposed sockets 37 and 47 and is securely attached to the sockets by means of screws that extend through screw holes 35 in the sockets and into the cross member 52.

A stabilizer 56 is pivotally attached to the cross member 52 at its mid-section by means of an adjustable bracket assembly 64. The stabilizer 56, which also preferably is formed of tubular metal, is shaped to define an arm 57 that extends forwardly from the cross member, and a trunk engaging portion 58, which preferably extends in a lateral direction relative to the support bars 22 and 23. The trunk engaging portion 58 is formed by the laterally extending section 59 of the metal bar that forms the stabilizer and a padded tubular sleeve 61, which is mounted on and covers the section 59. The padded sleeve 61 is provided to prevent scratching of the finish on the trunk lid 16 and to provide friction between the trunk lid 16 and the stabilizer when the bicycle carrier is securely lashed to the automobile.

Figure 5:
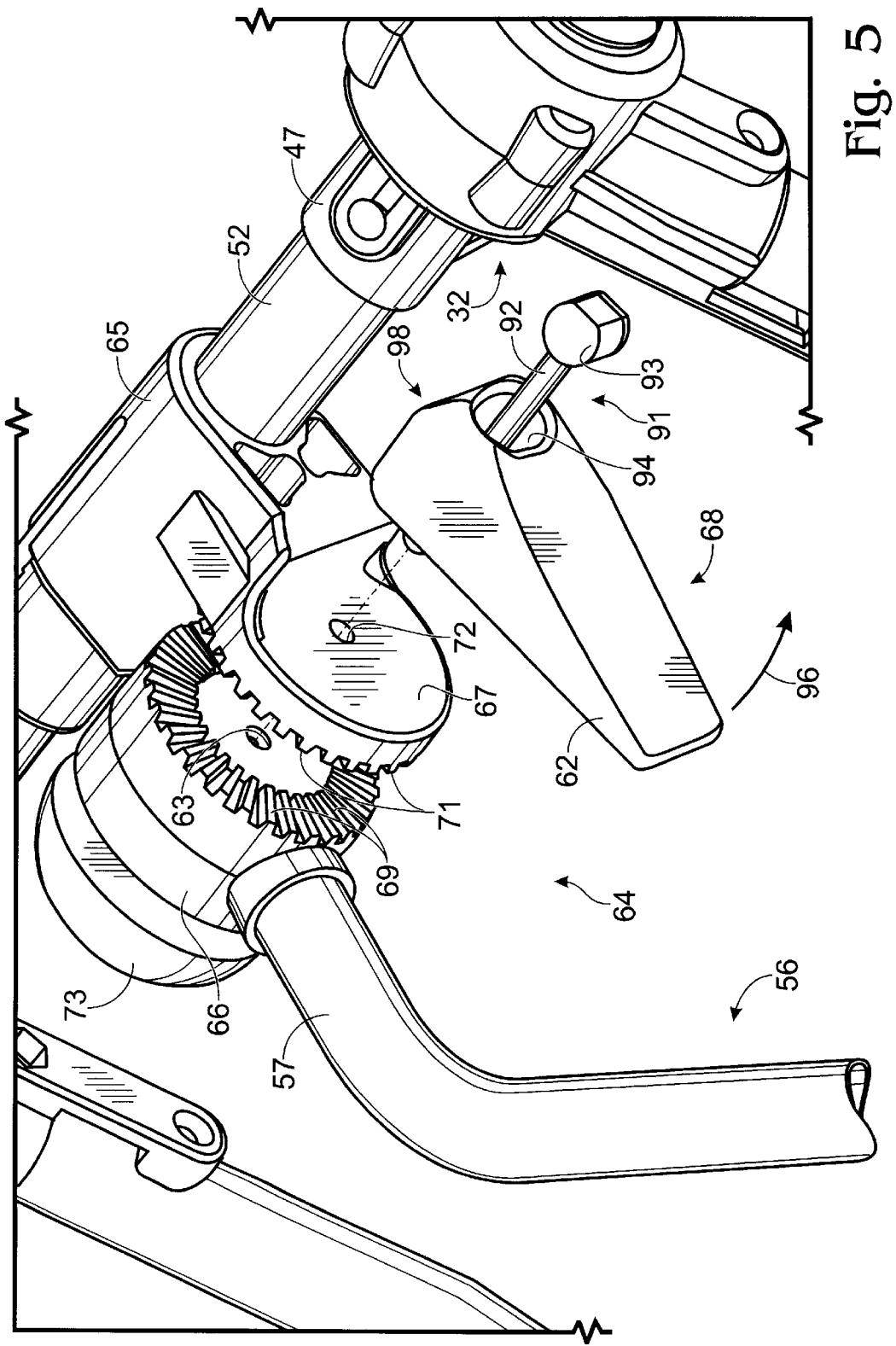
FIG. 5 is an exploded view of a lockable stabilizer adjustment mechanism that embodies principles of the invention in a preferred form.

The adjustable bracket assembly 64, which may be formed from injection molded plastic, metal, or a combination thereof, includes a mounting boot 65 that is received on the cross member 52. The mounting boot is securely attached to the cross member by means of screws or other appropriate fasteners that extend through screw holes 35 in the mounting boot and into the metal of the cross member 52. The mounting boot 65 is formed with a fixed central hub 67 having an inside face formed with radially extending teeth 71 (FIG. 5). The end portion of the stabilizer arm 57 is fixed within a stabilizer hub 66, which mates with the fixed hub 67. The stabilizer hub has an inside face formed with radially extending teeth 69 that mesh with the radially extending teeth 71 of the fixed hub 67. A cam lever 68 is associated with the hubs 66 and 67 and can be pulled or pivoted outwardly to disengage the stabilizer hub 66 from the fixed hub 67. This allows the stabilizer hub to rotate with respect to the fixed hub. Accordingly, when the hubs are disengaged, the stabilizer can be pivoted vertically as indicated by arrow 63. When the cam lever is pressed inwardly to its locking position as illustrated in FIG. 1, the fixed hub and stabilizer hub are brought together and the teeth 69 and 71 respectively of the hubs are engaged to lock the position of the stabilizer 56. The detailed operation of the adjusting bracket 64 is discussed in more detail below. It will be seen from the forgoing, however, that the adjusting bracket allows selective vertical adjustment of the stabilizer when mounting the bicycle carrier of this invention to an automobile.

FIG. 2 is a side elevational view of the bicycle carrier of this invention showing better and illustrating in more detail the leveling indicator of the carrier. The carrier 11 includes unitary convolutely-shaped frame 21 that defines support bars 22 and 23 (only bar 22 is visible in FIG. 2), vertically extending tube 24, and vehicle engaging member 27 covered by padded sleeve 28. Hub-shaped bracket 32 is secured to the frame as discussed above and includes sleeves 44 and 46, which cover short sections of the support bar 22 and the vertically extending tube 24 respectively. Stabilizer 56 includes arm 57 and trunk engaging portion 58 and is pivotally adjustably attached to the cross member 52 (not visible in FIG. 2) by means of adjustable bracket assembly 64.

Hub cap 76 is attached to and forms the outside face of the bracket 32 and includes the built-in leveling indicator 77. More specifically, the leveling indicator 77 includes an arcuate view slot 78 formed in the hub cap and through which a preferably brightly colored leveling ball 79 is visible. As detailed below, the leveling ball 79 rides in an arcuate track behind the hub cap 76 and thus its position along the arcuate slot 78 changes as the orientation of the carrier is adjusted as indicated by arrows 75. Level indicating indicia in the form of an index mark 81 is printed on or, more preferably, molded into the hub cap 76 to indicate the position of the leveling ball within the slot that corresponds to the optimum attitude of the support bars 22 and 23 relative to horizontal. In most cases, the optimum attitude of the support bars for supporting and carrying bicycles is one in which the support bars extend at a slight upward angle relative to horizontal as illustrated in FIG. 2. However, other attitudes may be chosen if desired depending upon the type of automobile and the conditions under which bicycles are to be transported. In these cases, the index mark 81 may be positioned to indicate the alternate attitude of the support bars. In fact, a scale of index marks may be provided around the arcuate slot 78 if desired to indicate a variety of attitudes of the support bars for ease of adaptability of the carrier to a corresponding variety of conditions.

FIG. 3 is a perspective illustration of the unitary frame 21 that forms a part of the bicycle carrier of this invention. As mentioned above, the frame 21 is formed from a single length of rigid tubular metal and is convolutely shaped to form a pair of spaced parallel support bars 22 and 23 connected by bend 29 to vertically extending tubes 24 and 26 respectively. Vertically extending tubes 24 and 26 are in turn connected by bends 30 to generally U-shaped vehicle engaging member 27, which generally is formed by the bight portion of the U-shaped member. As explained in more detail below, the unitary nature of the frame 21 serves a number of beneficial functions including the elimination of wear prone and complex hub assemblies connecting the support bars to the frame of the carrier as is common in the art. In addition, the unitary frame serves to transfer the weight of bicycles suspended from the support bars directly to the bumper of the vehicle and thus eliminates stress on functional components of the carrier, in turn eliminating stress related wear and ultimate failure.

Figure 4:
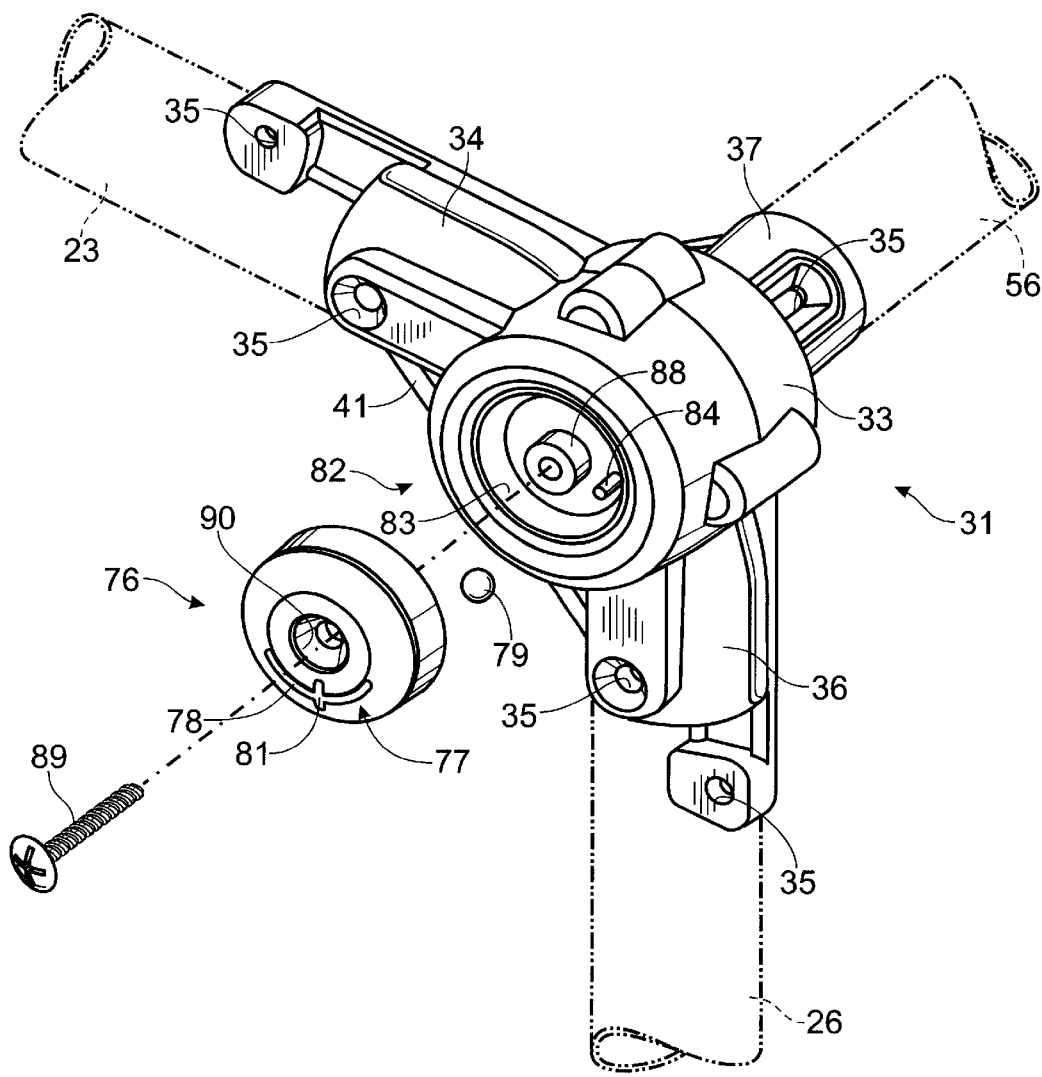
FIG. 4 is a perspective partially exploded view of one of the hub-shaped brackets of the carrier illustrating a preferred embodiment of the leveling indicator of the invention.

FIG. 4 is an exploded perspective view of one of the hub-shaped brackets of the carrier illustrating in more detail the construction of the preferred embodiment of the built-in leveling indicator thereof. The bracket 31 includes body 33 from which sleeves 34 and 36 project for covering short sections of the support bar 23 and vertically extending tube 26 of the unitary frame. Inwardly projecting socket 37 is sized to receive an end of the cross member 56 and the entire bracket assembly is firmly attached to the frame by means of screws (not shown) that extend through an array of screw holes 35 in the bracket and into the metal of the frame and cross member. The outside surface of the bracket body 33 is formed with a generally annular recess 82 that extends into the bracket a short distance and that includes a central outwardly projecting screw boss 88. The annular recess 82 is formed to define an arcuate track 83 that extends around the inner perimeter of the recess and a projecting stop 84 is provided at a predetermined circumferential location around the arcuate track 83.

Hub cap 76 is sized to be received in the annular recess 82 to form the outside face of the hub-shaped bracket 31. Hub cap 76 is formed with an arcuate view slot 78 that extends concentrically part way around the hub cap. An index mark 81 is provided at a predetermined location on the arcuate slot 78. A leveling ball 79, which, again, preferably is made of a brightly colored material, is sized to ride within and roll around the arcuate track 83 between the inside surface of the recess 82 and the inside surface of the hub cap 76. The hub cap 76 is secured within the annular recess, capturing the leveling ball 79 therein, by means of a screw 89, which extends through a central screw hole 90 in the hub cap and into screw boss 88. When assembled in this manner, the leveling ball 79 is visible through the arcuate slot 78, and its position along the track 83 can thus readily be determined simply be observing the slot 78.

When attaching the carrier 11 to the back of an automobile and adjusting the support arms vertically, the leveling ball may be seen moving to various locations along the slot 78. Index mark 81 is positioned such that when the leveling ball 79 is located at the position of the index mark, the support arms are oriented at the optimum attitude for supporting one or more bicycles suspended therefrom.

FIG. 5 is an exploded perspective view of the adjusting bracket assembly that attaches the stabilizer 56 to the cross member 52. As discussed above, the adjusting bracket assembly includes mounting boot 65 that is received on and secured to the cross member 52 of the carrier. Fixed hub 67 projects forwardly (away from the support arms) from the mounting boot and includes an inner face (not visible) formed with an array of radially extending teeth 71. An axial bore 72 is formed through the fixed hub.

The stabilizer 56 is mounted within a stabilizer hub 66, which also has an inner face formed with an array of radially extending teeth 69 positioned and sized to mesh with the radially extending teeth 71 of the fixed hub 67. An axial bore 63 also is formed through the stabilizer hub and is positioned to align with the axial bore 72 in the fixed hub when the two hubs are aligned face to face with each other. A stabilizer hub cap 73 is disposed adjacent the outer face of the stabilizer hub 66.

A cam lever 68 is formed with a handle portion 62 at one end and a locking pin socket 94 at its other end. Locking pin 91 includes a locking pin shaft 92 on which a locking pin head 93 is formed. The locking pin shaft 92 is sized to extend through the locking pin socket 94 of the cam lever, through the aligned axial bores 72 and 63 of the fixed hub and stabilizer hub respectively, and into the stabilizer hub cap 73, into which the end of the locking pin shaft 92 is fixed. When extending through the assembly in this manner, the locking pin head 93 is captured within the locking pin socket 94 of the cam lever 69. It will thus be seen that the locking pin secures the cam lever, fixed hub, stabilizer hub, and stabilizer hub cap together. A slot (not visible in FIG. 5) is formed in the back end portion 98 of the cam lever 68 and is sized to pass the locking pin shaft 92.

The adjusting bracket assembly functions as follows to allow selective vertical adjustment of the stabilizer relative to the support bars of the carrier. When it is desired to adjust the stabilizer, the cam lever 68 is pulled outwardly in the direction of arrow 96. This moves the back end portion 98 of the cam lever into abutting relationship with the fixed hub 67, the locking pin shaft 92 moving through the slot formed in the back end portion 98. This allows the head 93 of the locking pin to move closer to the fixed hub 67 thereby loosening the assembly and disengaging the teeth 71 of the fixed hub from the teeth 69 of the stabilizer hub. With the teeth disengaged, the stabilizer can be pivoted freely about the locking pin to move the trunk engaging portion up or down as indicated by arrow 63 (FIG. 1). When the stabilizer is located at a desired pivotal orientation, the cam lever 68 is pushed back in. This draws the locking pin to the right in FIG. 5 and, in turn, pulls the fixed and stabilizer hubs together, firmly engaging their teeth to lock the stabilizer in position. Thus, adjustment of the stabilizer is a simple matter easily accomplished by one person.

In use, the bicycle carrier 11 is mounted to the rear end of an automobile as follows. First, the carrier is positioned on the back of the automobile with its vehicle engaging member and padded sleeve 28 resting atop the bumper and nestled in the junction of the bumper and the back panel of the automobile. The cam lever 68 is then pulled out to disengage the teeth of the fixed hub 67 and the stabilizer hub 66, allowing the stabilizer to pivot downwardly until its trunk engaging portion 58 rests loosely atop the trunk lid 16. The orientation of the carrier is then adjusted by moving the support arms up and down, pivoting the carrier about the vehicle engaging member resting on the bumper of the car.

As the carrier is being adjusted, one of the leveling indicators is observed and monitored and the adjustment is continued until the leveling ball of the leveling indicator is aligned with the index mark 81 adjacent the arcuate view slot. During this adjustment procedure, the stabilizer continues to rest loosely atop the trunk lid, the adjustment bracket assembly allowing the stabilizer to pivot as needed to match the movements of the frame. Alignment of the leveling ball with the index mark signals the user that the support arms 22 and 23 are oriented at the appropriate attitude relative to horizontal for receiving and carrying bicycles. As mentioned above, the preferable attitude is one in which the support bars extend at a slight upward angle as best illustrated in FIG. 2.

With the carrier properly adjusted as indicated by the leveling indicator, the cam lever 68 is pressed back to its locked position, engaging the teeth of the fixed and stabilizer hubs. The stabilizer is thus locked in the proper orientation for stabilizing the carrier in place with its support bars oriented at the optimum attitude. Of course, the position of the stabilizer may vary widely depending upon the make and model of automobile and its trunk design. In fact, one significant advantage of the carrier of this invention is its virtually universal adaptability to automobiles with a wide variety of trunk designs. When the stabilizer is locked, the carrier is securely lashed to the car in the traditional way by means of straps extending through the strap guides and secured to the edges of the trunk lid, bumper, or the like with appropriate hooks. One or more bicycles is then mounted and secured on the carrier for being transported.

The invention has been described herein in terms of preferred embodiments and methodologies, which represent the best mode known to the inventors of carrying out the invention. However, these preferred embodiments are not intended to be limiting in nature but only to teach one of ordinary skill in the art how to make and use the invention without undue experimentation. It will be understood that a number of variations on the theme of the preferred embodiments might be made within the scope of the invention. For example, the precise shape of the convolutely-shaped unitary frame of the carrier is not limited to the illustrated shape. In fact, other shapes adapted to special applications might well be implemented. The same is true for the shape of the stabilizer.

The preferred embodiment of the leveling indicator is illustrated as a leveling ball rolling in an arcuate track and visible through a view slot. Such a configuration is preferred because of its reliability and simplicity of operation. However, other means of indicating a level condition such as, for example, traditional bubble levels, may also be employed as long as the preferred orientation of the carrier is indicated to a user while mounting the carrier to an automobile. A specific alternative to the leveling ball is a small brightly colored hanging pendulum rotatably mounted on the screw boss within the recess of the hub-shaped bracket, the pendulum being visible through the view slot. These and many other additions, deletions, and modifications to the preferred embodiments illustrated herein may well be made by those of skill in the art without departing from the spirit and scope of the invention as set forth in the claims.

What is claimed is:

1. A bicycle carrier for mounting to the rear end portion of an automobile to support one or more bicycles for transport, said bicycle carrier comprising:

a unitary convolutely-shaped frame defining a pair of spaced apart substantially parallel support bars at one end for supporting one or more bicycles and a vehicle engaging member at another end for engaging and resting against the rear end portion of an automobile;

a first bracket mounted to said frame intermediate one of said support bars and said vehicle engaging member;

a second bracket mounted to said frame intermediate the other one of said support bars and said vehicle engaging member;

said first and second brackets being spaced apart and aligned with each other;

a cross member mounted to and extending between said first and second brackets;

a stabilizer mounted to said cross member and extending therefrom in a direction away from said support bars to a free end configured to engage the automobile at a location above said vehicle engaging member for stabilizing said bicycle carrier; and means for lashing said carrier securely to the automobile.

2. A bicycle carrier as claimed in claim 1 and wherein said stabilizer is pivotally mounted to said cross member for selectively positioning said free end of said stabilizer so that said support bars extend rearwardly at a predetermined attitude when said free end of said stabilizer engages the automobile.

3. A bicycle carrier as claimed in claim 2 and further comprising a locking mechanism for locking said stabilizer in a selected pivotal position.

4. A bicycle carrier as claimed in claim 1 and further comprising a pad on said vehicle engaging member for resting against the rear end of the vehicle to provide friction and to prevent marring of the vehicle.

5. A bicycle carrier as claimed in claim 4 and further comprising a pad on said free end of said stabilizer for resting against the vehicle to provide friction and to prevent marring of the vehicle.

6. A bicycle carrier as claimed in claim 1 and wherein said stabilizer is convolutely shaped to define an arm extending away from said cross member and a free end that is oriented substantially transverse to said arm.

7. A bicycle carrier as claimed in claim 1 and further comprising a leveling indicator on said carrier for indicating a predetermined optimum attitude of said support members.

8. A bicycle carrier as claimed in claim 7 and wherein said leveling indicator is located on at least one of said brackets.

9. A bicycle carrier as claimed in claim 8 and wherein said leveling indicator comprises a ball riding in an arcuate track and an opening through which said ball can be observed as said support members near their predetermined optimum attitude.

10. A bicycle carrier as claimed in claim 9 and wherein said opening comprises an arcuate slot through which said ball is visible as it rides in said arcuate track and further comprising indicia for indicating a position of said ball corresponding to said predetermined optimum attitude of said support members.

* * * * *